United States Patent [19]

Nakayama et al.

[11] Patent Number: 4,901,148

[45] Date of Patent: Feb. 13, 1990

[54] DATA PROCESSING DEVICE

[75] Inventors: Tadayoshi Nakayama; Chikara Satoh; Akio Fujii; Katsuji Yoshimura; Koji Takahashi, all of Kanagawa, Japan

[73] Assignee: Canon Kabushiki Kaisha, Tokyo, Japan

[21] Appl. No.: 143,974

[22] Filed: Jan. 14, 1988

[30] Foreign Application Priority Data

Jan. 19, 1987 [JP] Japan ................................. 62-009530
Jan. 20, 1987 [JP] Japan ................................. 62-010175

[51] Int. Cl.$^4$ .............................................. H04N 7/01
[52] U.S. Cl. ..................................... 358/140; 358/138
[58] Field of Search ............... 358/140, 160, 102, 141, 358/134, 138

[56] References Cited

U.S. PATENT DOCUMENTS 4,658,284 4/1987 Kawamura ........................... 358/140
4,710,826 12/1987 Sakurai .................................. 360/9.1
4,730,212 3/1988 Wojcik .................................. 358/140

Primary Examiner—Howard W. Britton
Attorney, Agent, or Firm—Robin, Blecker, Daley & Driscoll

[57] ABSTRACT

A data processing device having a memory which permits writing and reading of digital data and a digital-to-analog converter which converts digital data read out from the memory into an analog signal. The operating frequency of the converter obtained when the memory is solely performing data reading is arranged to be twice as high as the operating frequency of the converter obtained when the memory is performing both data writing and data reading.

14 Claims, 11 Drawing Sheets

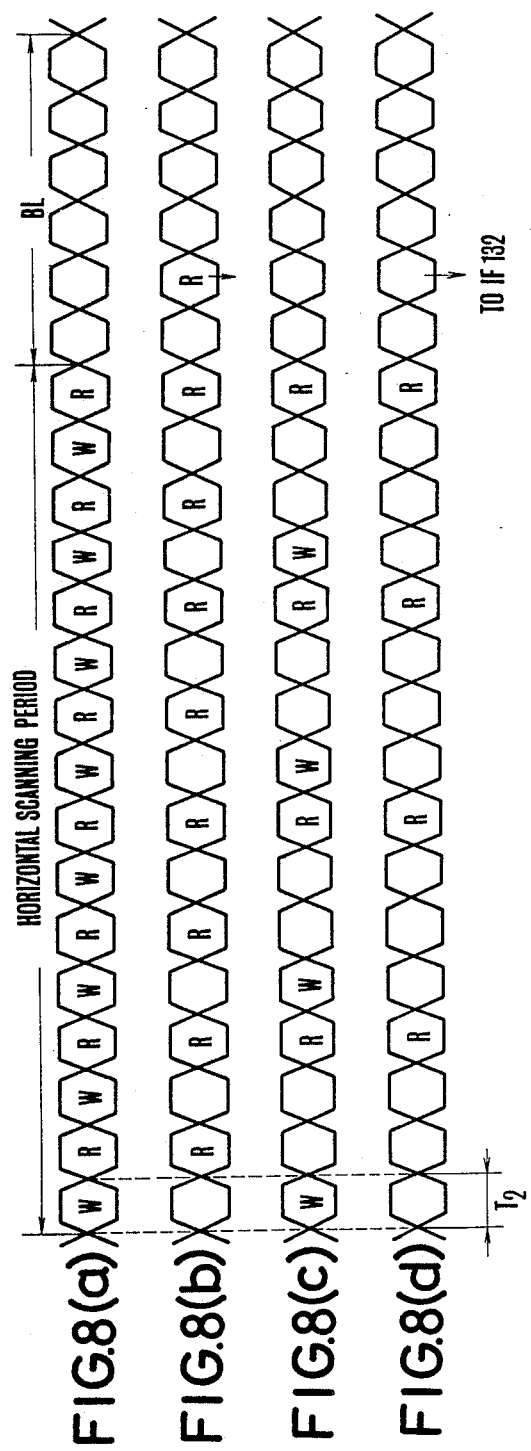

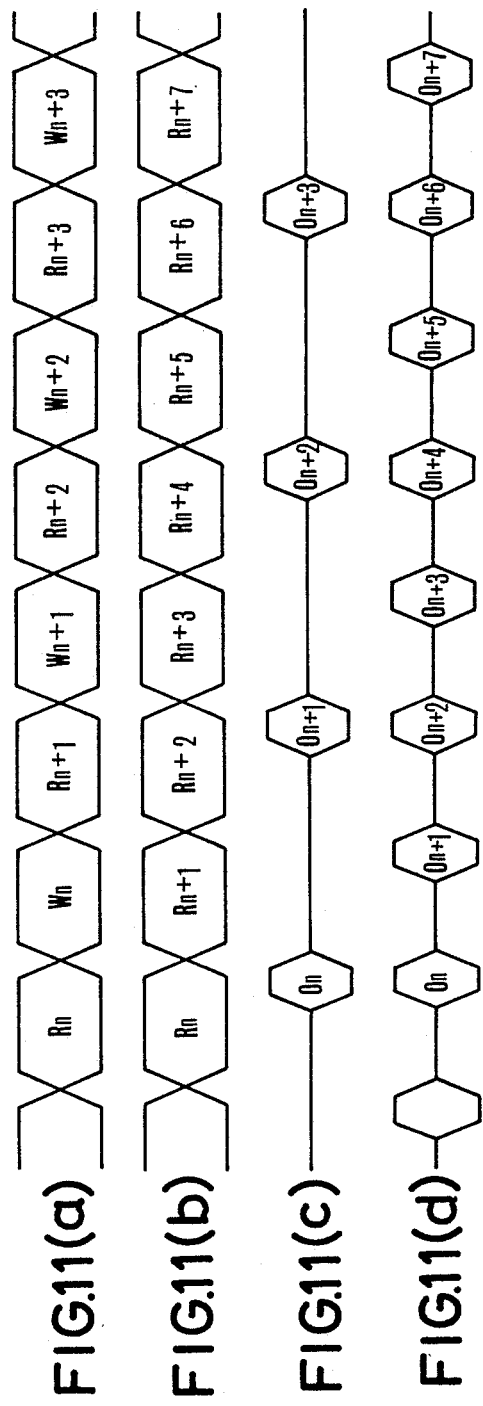

DATA PROCESSING DEVICE

BACKGROUND OF THE INVENTION

1. Field of the Invention

This invention relates to a data processing device and more particularly to a data processing device having a memory which permits writing and reading of digital data into and from the memory.

2. Description of the Related Art

As a result of the recent increase in capacity and reduction in size of memory devices, memory devices capable of storing one frame portion of a TV signal, such as the one called a frame memory, have come to be used for apparatuses designed for the general public users. The use of such memory devices, for example, for still-picture or slow-motion reproduction or the like has come to enable a VTR to give non-standard reproduced pictures with high quality.

Meanwhile, a system for digitally recording a still picture with a VTR, separately from an analog video signal, by using the memory of the above stated kind has been proposed, as disclosed in U.S. patent application Ser. No. 937,872. This system enables even the VTR of the kind called a home VTR to record and reproduce a still picture of very high quality.

FIG. 1 of the accompanying drawings shows the simplest arrangement for writing and reading a video signal into and from the frame memory. The illustration includes an input terminal 1 arranged to receive an analog video signal; and an analog-to-digital (hereinafter referred to as A/D) converter 2. A digital signal on line 3 which is produced from the A/D converter 2 is written into or read out from a memory 4 in accordance with an address obtained from an address generator 8 over lines 9. A digital signal on line 5 read out from the memory 4 is converted back to an analog signal by a digital-to-analog (hereinafter referred to as D/A) converter 6. The analog signal thus obtained is produced from an output terminal 7.

FIGS. 2(a) to 2(d) show in a timing writing and reading actions performed on this memory 4. The writing and reading actions on the memory 4 are performed in a time sharing manner. Within a period during which the address generator 8 is designating one and the same address, the reading action is performed during the first half of the period and the writing action during the latter half period. Change-over from reading to writing is accomplished in accordance with a writing control signal which is given from the address generator 8 to the memory 4 as shown in FIG. 2(d).

In the timing chart, FIG. 2(a) shows addresses given from the address generator 8. FIG. 2(b) shows the digital produced from the memory 4. FIG. 2(c) shows the digital signal supplied to the memory 4. FIG. 2(d) shows the writing control signal. This timing chart is on the assumption that the cycle time T of the writing and reading actions on the memory 4 is the same as the sampling period of the A/D converter 2. If the operation of the memory 4 is slow and the above stated cycle time thus must be set at a value longer than the sampling period, the cycle time can be equivalently made to coincide with the sampling period by arranging a plurality of memories in parallel and by using them as one memory.

The digital signal produced from the memory 4 is somewhat behind the designated timing of the address. This delay is caused by an access time resulting from the structural characteristic of the memory. Once a writing action is performed after the output timing of the memory 4 is set, the output timing is unvarying. In actual arrangement, therefore, a latch circuit is provided at the output terminal of the memory 4. The output of the memory 4 is supplied to the D/A converter 6 after the output is held by the latch circuit.

The contents of the memory are incessantly renewed as long as the memory 4 is in operation. However, it is possible to retain the contents of the memory 4 by inhibiting a writing action by keeping at a low level the writing control signal which is as shown in FIG. 2(d). For example, it is possible to obtain a still picture from the memory 4 even when a motion picture signal is received at the input terminal 1.

FIG. 3 shows another example of the conventional arrangement for writing and reading a video signal into and from the frame memory. In FIG. 3, the same components as those shown in FIG. 1 are indicated by the same reference numerals and the details of them are omitted from this description. In the case of this arrangement, the digital signal from the A/D converter 2 is written into the memory 4 in accordance with an address obtained from a writing address generator 10. The digital signal from the memory 4 is read out and supplied to the D/A converter 6 in accordance with an address obtained from a reading address generator 11. There is provided a manual operation part for designating a reading address. This arrangement makes it possible to differentiate a writing address from a reading address. This enables a picture to be enlarged, reduced, inverted or processed to give some other special effect. Further, the transmission rate of the incoming digital signal and that of the outgoing digital signal can be arranged to differ from each other without difficulty.

FIGS. 4(a) to 4(d) show in a timing chart the operation of the memory of FIG. 3. FIG. 4(a) shows writing (W) and reading (R) addresses. FIGS. 4(b), 4(c) and 4(d) show the same things as FIGS. 2(b), 2(c) and 2(d). In this case, the reading cycle TRC and the writing cycle TWC are arranged to be normally the same. Therefore, the sample period of the A/D converter 2 can be expressed as TRC +TWC. The memory 4 of FIG. 3 thus must be operated at a speed twice as high as the operation of the memory 4 of FIG. 1. The memory, therefore, must be capable of operating at a high speed.

FIG. 5 shows by way of example a system for recording and reproducing a still picture on and from a tape by using a memory of the above stated kind and by utilizing the recording and reproducing functions of a VTR disclosed in the previous patent application cited in the foregoing. An NTSC standard camera 110 is arranged to be driven at a rate of 525 lines/frame, 60 field/sec and 30 frames/sec on the basis of a synchronizing (hereinafter referred to as sync) signal which will be described later herein. A video signal produced from the camera 110 is serially supplied to an A/D converter 112. The A/D converter 112 samples the input signal at a sampling frequency fs which satisfies the Nyquist theorem. The sampled signal is quantized (in 8 bits, for example). The quantized output of the A/D converter 112 is written in at a corresponding address of a memory 114. The data written in the memory 114 is read out and supplied to a D/A converter 116 to be converted into an analog signal as necessary. The output terminal of the D/A converter 116 is connected to an NTSC standard monitor 118.

A circuit which forms the sync signal for driving the standard camera 110 and various clock pulses is arranged as follows: An original oscillator 120 is arranged to generate reference clock signal, which is applied to a frequency dividing circuit 122 and a memory control circuit 124. The memory control circuit 124 is arranged to prepare various clock signals on the basis of the reference clock signal for driving a memory 114. These various clock signals are supplied to the memory 114 along with an address signal. The frequency dividing circuit 122 is arranged to frequency divide the reference clock signal and supplies a frequency divided signal to a horizontal counter 126. The circuit 122 also supplies an A/D converter 112 and a D/A converter 116 with a sampling clock signal which is of a frequency fs. The horizontal counter 126 is arranged to prepare a horizontal sync signal HD of a frequency fH by counting the pulses of the clock signal received from the frequency dividing circuit 122. The counter 126 supplies a count value thus obtained to a ROM 128 and the horizontal sync signal HD to a vertical counter 130 respectively. The vertical counter 130 is arranged to count the horizontal sync signal HD and to supply a count value thus obtained to the ROM 128. The ROM 128 is arranged to prepare a composite sync signal of the NTSC system on the basis of the count values from the horizontal and vertical counters 126 and 130. The composite sync signal is applied to the standard camera 110. An interface 132 is arranged to relay digital data read out from the memory 114 to a VTR 134.

The operation of the memory 114 is as follows: The circuit arrangement shown in FIG. 5 has two operation modes including a motion picture output mode and a still picture output mode. Generally, it is impossible to select writing or reading into or out of a memory during a period of time (hereinafter referred to as a period TM) which is determined by the characteristic of the element employed as the memory. Assuming that the sampling period Ts (=1/fs) is more than twice as much as the period TM, writing into and reading from the memory can be performed i real time. However, in the case of a system whereby one frame portion of a picture is to be transmitted in 1/60 sec, the sampling time Ts is often shorter than the period TM and it is difficult to write and read in real time.

Generally, therefore, a memory which serves as a buffer is arranged on the input side of the memory 114. A given number (an i number) of data is taken into the buffer memory in real time. Data is written into a j number of memories (i ≦j) in parallel within a period not exceeding ½ of a period of time iTs required in taking the data in. Then, the data is read out within the remaining half of the period of time iTs. The data thus read out is processed to be brought back to its original rate of transmission by means of a buffer memory. Such arrangement gives a period of iTs/2 for each of the writing and reading actions on the memory. If TM<ITs/2, data writing and data reading thus can be accomplished apparently in a continuously manner. The period of time available for writing and reading into and out of the memory, i.e. the cycle time of the memory is as indicated by a reference symbol T1 in FIGS. 6(a) and 6(b) which shows the memory operation in a timing chart. Generally, this cycle time is set at a value which gives a sufficiently long allowance relative to the period TM. In the case of FIGS. 6(a) and 6(b), this cycle time is set at ½ of a horizontal scanning period excluding a horizontal blanking period BL. As a result, the memory 114 of FIG. 5 is arranged to write and read ¼ of one horizontal scanning line portion of the NTSC signal at a time. In the motion picture output mode, the memory 114 repeats writing (W) and reading (R) in this manner at the timing as shown in FIG. 6(a). A video signal produced from the camera 110 is thus serially applied to a monitor 118. The monitor 118 then displays pictures taken by the camera 110 one after another.

In the still picture output mode, writing into the memory 114 is inhibited when one frame portion of the video signal is written into the memory 114. Then, as shown in FIG. 6(b), one frame portion of the video signal is recurrently read out from the memory 114 to have a still picture displayed by the monitor 118. In recording a still picture, during a horizontal blanking period BL as shown in FIGS. 6(a) and 6(b), the data of one horizontal scanning part stored by the memory 114 is transferred to the interface 132 to be digitally recorded by the VTR 134. The digital recording by the VTR 134 is as briefly described below:

Assuming that 4 N bytes of information is written in the memory 114 per horizontal scanning period (hereinafter referred to as a period H), the interface 132 receives 4 N bytes of information within one horizontal blanking period BL. Then, assuming that this VTR is of known 8 mm VTR standard specifications, the VTR is incapable of processing more than 4 bytes of information per period H. Therefore, the interface 132 is arranged to take in at a rate of one H portion of data in N number of periods H and to change its transmission rate to a given transmission rate in sending the data to the VTR 134 in the form of serial data. In this VTR, a PCM signal processing circuit is arranged in a well known manner and is, therefore, omitted from description here.

As described in the foregoing, the conventional system is arranged to have one and the same kind of video signal obtained, for example, by an NTSC standard camera displayed by an NTSC monitor and to have it PCM recorded by an 8 mm VTR. Meanwhile, however, a high definition type camera arranged as an image input device to operate at a rate of 1,051 lines/frame, 30 field/sec and 15 frames/sec has appeared during recent years. Further, a double scanning type monitor arranged as an image output device to operate at a rate of 525 lines/field, 60 fields/sec and 60 frames/sec has been developed. The conventional still picture recording/reproducing system described in the foregoing is hardly applicable to such a high definition camera and such a double scanning type monitor.

SUMMARY OF THE INVENTION

It is an object of this invention to provide a data processing device which is capable of solving the above stated problem permitting variable setting of the frequency of data written in and read out from a memory.

It is another object of the invention to provide a data processing device which is capable of handling signals of different kinds having different bands by writing in and reading out from a memory any of the signals of the different kinds.

Under this object, a data processing device arranged as an embodiment of this invention comprises a first signal generating source arranged to generate a first information signal; a second signal generating source arranged to generate a second information signal which has a greater amount of information per unit time than the first information signal; selecting means for selectively producing said first information signal or said second information signal; A/D converting means for analog-to-digital converting the signal produced from the selecting means; storing means for storing the signal digitized by the A/D converting means; and change-over means for changing the sampling frequency of the A/D converting means and the data writing cycle of the storing means in response to the selecting action of the selecting means.

It is a further object of the invention to provide a data processing device which is capable of efficiently using a memory and increasing the amount of information read out from the memory per unit time without increasing the operating speed of the memory.

Under that object, a data processing device arranged as another embodiment of the invention comprises storing means arranged to permit writing and reading a digital signal into and from the storing means; D/A converting means for converting into an analog signal the digital signal read out from the storing means; and change-over means for switching the device between a first mode and a second mode, the device being arranged, in the first mode, to have the storing means perform writing and reading actions on a digital signal and to set the operating frequency of the D/A converting means at a first frequency and in the second mode, to have the storing means perform solely a reading action on a digital signal and to set the operating frequency of the D/A converting means at a second frequency which is twice as high as the first frequency.

The above and other objects and features of the invention will become apparent from the following detailed description of embodiments thereof taken in connection with the accompanying drawings.

BRIEF DESCRIPTION OF THE DRAWINGS

FIGS. 8(a) to 8(d) show in a timing chart the operation of a memory shown in FIG. 7.

FIGS. 11(a) to 11(d) show in a timing chart the operation of the memory of FIG. 10.

DETAILED DESCRIPTION OF THE PREFERRED EMBODIMENTS

Figure 9A:
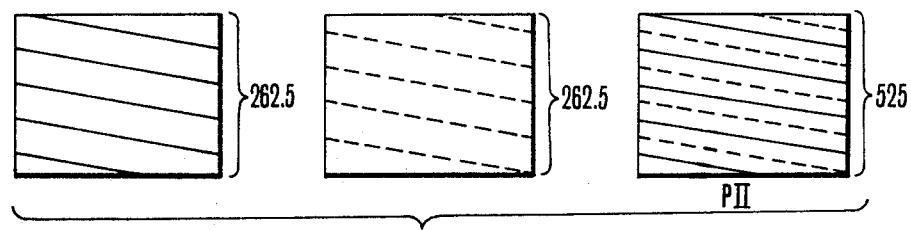
FIGS. 9(a) to 9(c) show a different mode of scanning video signals.
Figure 9B:
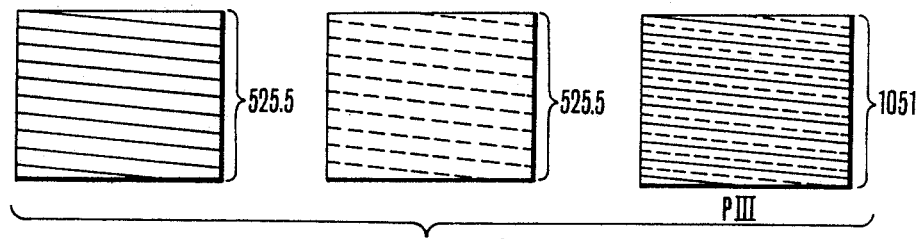
Figure 9C:
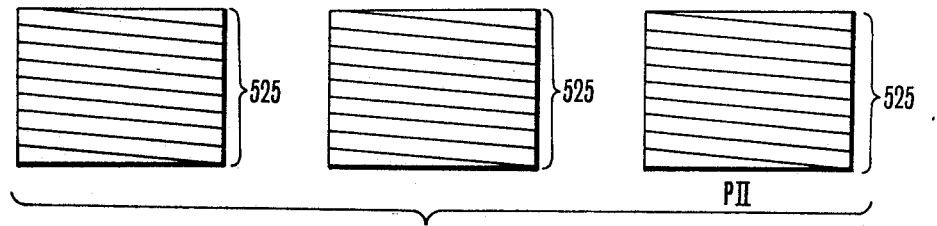

An embodiment of this invention is described below with reference to the accompanying drawings:

Before describing the embodiment, the modes of scanning of a high definition camera and a double scanning type monitor are briefly described as follows: FIG. 9(a) schematically shows the known scanning modes of an NTSC standard camera and an NTSC monitor. FIG. 9(b) schematically shows the scanning modes of a high definition camera. FIG. 9(c) also schematically shows the scanning modes of a double scanning monitor. In the case of the high definition camera, as shown in FIG. 9(b), the number of scanning lines for one field is about two times as many as that of the standard camera and interlaced scanning is performed. The scanning is carried out at a rate of 30 fields/sec and 15 frames/sec. Therefore, the horizontal scanning frequency is the same as in the case of the standard camera. The double scanning monitor is arranged, as shown in FIG. 9(c), to have a number of scanning lines for one field twice as many as the standard camera and, therefore, the horizontal scanning frequency of the monitor is twice that of the standard camera.

Figure 5:
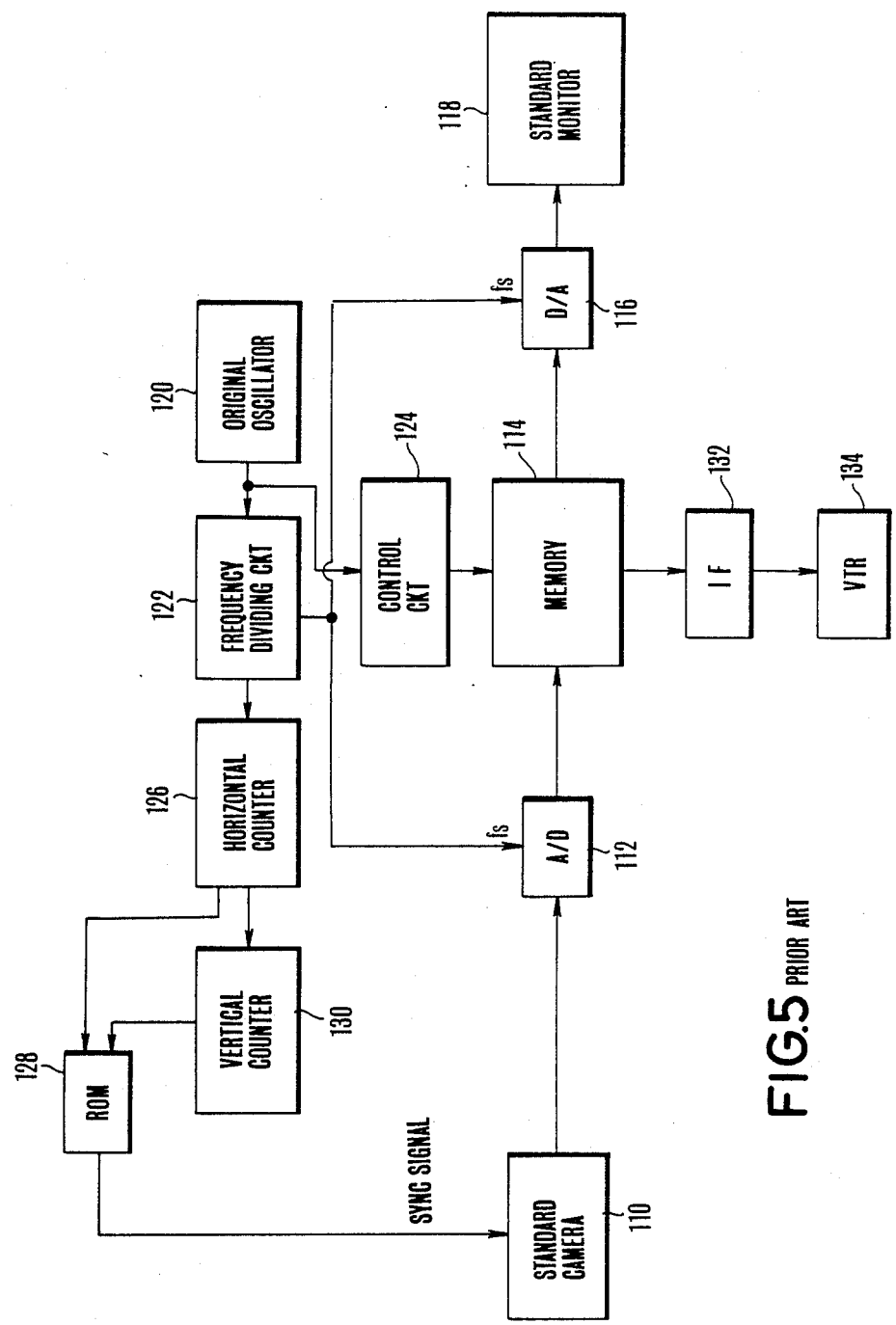
FIG. 5 shows by way of example the conventional system using a memory.
Figure 6:
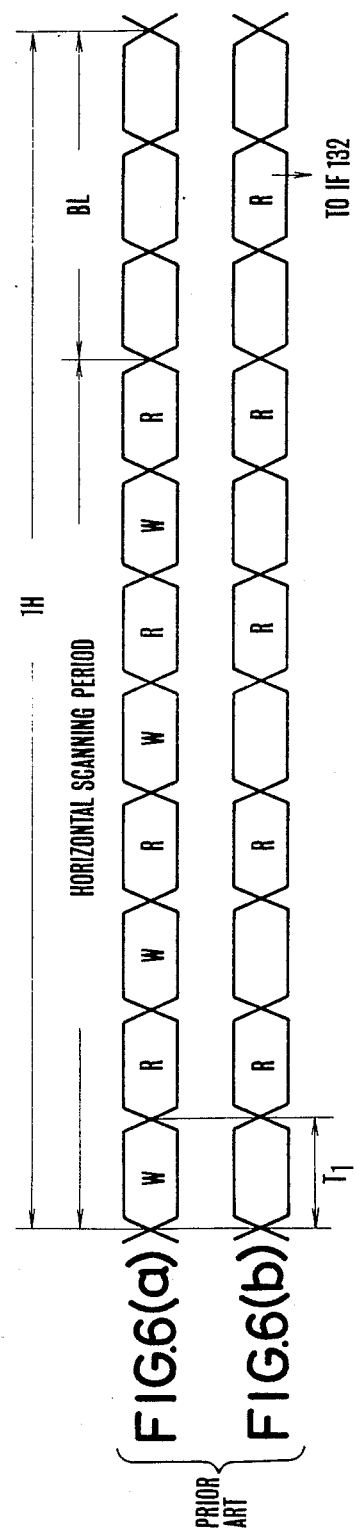
FIGS. 6(a) and 6(b) show in a timing chart the operation of the memory of FIG. 5.
Figure 7:
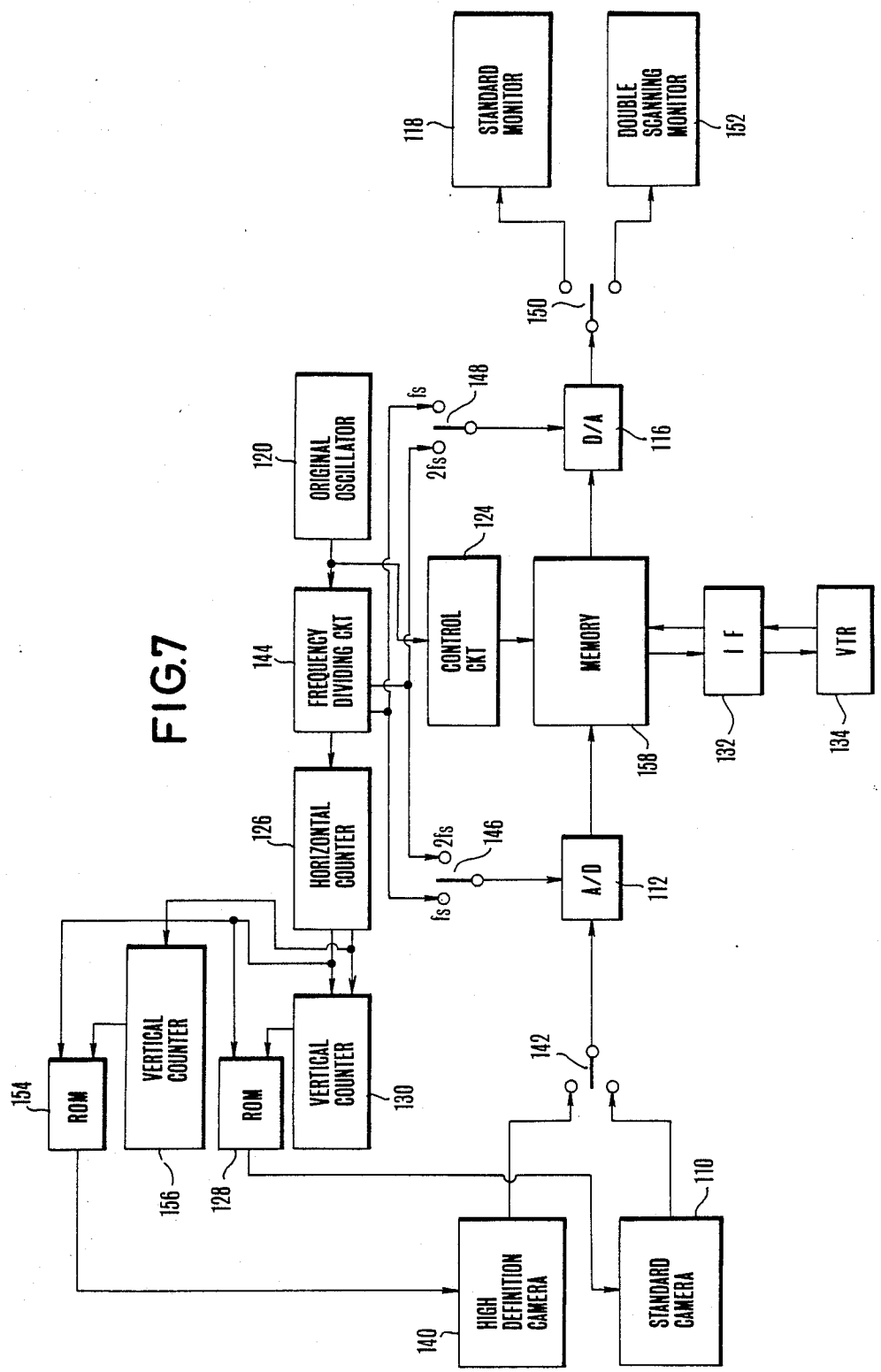
FIG. 7 is a block diagram showing the arrangement of a system arranged as an embodiment of this invention.

FIG. 7 shows in a block diagram the components of an embodiment of the invention. In FIG. 7, the same component elements as those of FIG. 5 are indicated by the same reference numerals. The illustration includes a high definition camera 140 which operates at a rate of 1,051 lines/frame, 30 fields/sec and 15 frames/sec. Either the high definition camera 140 or a standard camera 110 is selectively used by manually operating a selection switch 142. A frequency dividing circuit 144 is arranged to obtain from reference clock pulses generated by an original oscillator 120 not only the above stated sampling clock signal but also a sampling clock signal of a frequency 2 fs. Switches 146 and 148 are arranged to selectively apply these sampling clock signals to an A/D converter 112 and a D/A converter 116. Switch 146 is interlocked with the switch 142. Switch 150 is arranged to serve as an output device and to be manually operated for selection between a standard monitor 118 and a double scanning monitor 152. Switch 148 is interlocked with the switch 150. In case where either the monitor 118 or the monitor 152 is to be connected by means of a connector for a reproduction display, this switch 150 is of course not necessary and the switch 148 is alone manually operated. In case that the standard camera 110 is employed as an image input device, the switch 146 applies the sampling clock signal of frequency fs to the A/D converter 112. If the high definition camera 140 is selected as the image input device, the switch 146 applies the sampling clock signal of frequency 2 fs to the A/D converter 112. Further, if the NTSC standard monitor 118 is to be employed as an image output device, the switch 148 is operated to apply the sampling clock signals of frequency fs to the D/A converter 116. If it is the double scanning monitor 152 that is to be employed as the image output device, the switch 148 is operated to apply the sampling clock signal of frequency 2 fs to the D/A converter 116.

The embodiment is provided with a ROM 154 and a vertical counter 156 for forming a composite sync signal which is to be used for driving the high definition camera 140. The vertical counter 156 is arranged to count the horizontal sync signal HD coming from the common horizontal counter 126. The ROM 154 is arranged to form the composite sync signal from the horizontal sync signal fH and a count value obtained by the vertical counter 156 and applies it to the high definition camera 140.

A memory 158 is arranged to operate at ½ of the above stated cycle time as indicated by a reference symbol T2 in FIGS. 8. With the exception of this, the memory 158 is controlled in exactly the same manner as in the arrangement of the conventional memory 114. More specifically, the memory 158 is controlled as follows: In writing into the memory 158, a buffer memory which is of the same capacity as in the case of the memory 114 of FIG. 5 is operated to take in ¼ of one horizontal scanning line portion of the video signal, if it is from the standard camera 110 or ½ of one horizontal scanning line portion of the video signal if it is from the high definition camera 140. Then, writing into the memory 158 is accomplished within a period not exceeding the cycle time (T2) of the memory set at 1/16 of the horizontal scanning period excluding the blanking period BL. Therefore, data is written into the memory 158 at every four cycle times in the case of the standard camera 110 or at every two cycle times if the high definition camera 140 is selected.

In reading from the memory 158, a buffer memory is operated to take in the signal within a period of time other than the time used in writing either at every period of two cycle-time in the case of supplying the signal to the double scanning monitor 152 or at every period of four cycle-time if the signal is to be supplied to the standard monitor 118. In this instance, the signal taken into the buffer memory is ¼ horizontal scanning line portion of the signal. This portion of the signal is produced and supplied to the monitor at a constant transmission rate which is at a period of 4 T2 in case that the monitor is the standard monitor 118 or at a period of 2 T2 in the event of the double scanning monitor 152.

FIG. 8(a) shows the operation of the memory 158 performed in displaying the video signal obtained from the high definition camera 140 by the double scanning monitor 152. In this instance, writing (W) and reading (R) are repeated at every two cycle-time periods. Then, one frame portion of the video signal from the high definition camera 140 is four times as much as one field portion of the signal displayed by the double scanning monitor 152. Reading from the memory 158 is performed by thinning out the one frame portion of the signal from the high definition camera 140 to ¼, that is, by thinning out the number of scanning lines to ½ and the number of picture elements to ½.

FIG. 8(b) shows a case where the operation of the memory 158 is performed to have a still picture displayed at the double scanning monitor 152 by inhibiting further writing into the memory 158. In that instance, reading is repeated in a cycle of two cycle-time periods. In case that the still picture is to be recorded by the VTR 134, data is supplied to the VTR 134 via an interface 132 during the blanking period BL. Then, the VTR 134 performs digital recording in the same manner as in the case of the conventional system described in the foregoing.

FIG. 8(c) shows a case where the memory 158 is operated to have the video signal from the standard camera 110 displayed by the NTSC standard monitor 118. In this case, writing and reading are repeated in a cycle of four cycle-time periods. FIG. 8(d) shows another case where a still picture is to be displayed at the NTSC monitor 118 by inhibiting any writing action on the memory 158. In that case, reading is repeated in a cycle of four cycle-time periods. In case that the still picture is to be PCM recorded, data is supplied to the interface 132 during the blanking period BL in the same manner as mentioned in the foregoing. Further, the embodiment permits the video signal of the standard camera 110 to be displayed at the double scanning monitor 152 or the video signal of the high definition camera 140 to be displayed at the NTSC standard monitor 118.

Further, in writing into a memory 158 a still picture digitally recorded by the VTR 134, 4 bytes of information per period H are converted by the interface 132 into 4N bytes data before it is applied to the memory 158.

As apparent from the foregoing description, the embodiment of this invention is arranged to permit writing image data into a memory by selectively using a plurality of different cameras without necessitating use of many additional circuit elements. Therefore, the object of the invention can be attained without significantly increasing the scale of necessary circuit arrangement.

In obtaining a still picture, writing into the memory must be inhibited. In the case of the frame memory of FIG. 3, the writing address is then uselessly supplied to the memory 4. Therefore, the efficiency of the use of the memory lowers by half in terms of time. Whereas, a data processing device which is arranged as another embodiment of this invention solves this problem.

Figure 1:
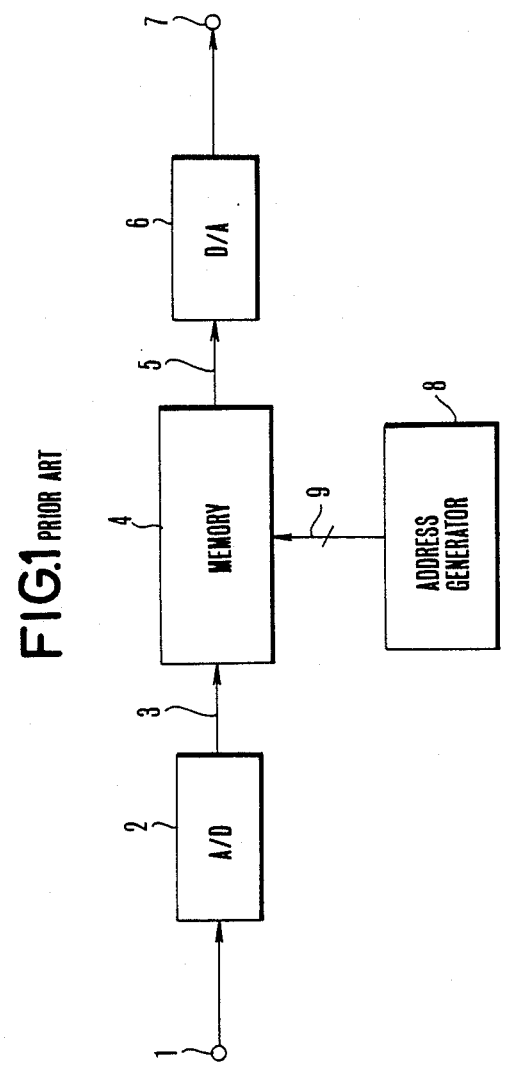
FIG. 1 is a block diagram showing bY way of example the conventional circuit arrangement around a memory.
Figure 2:
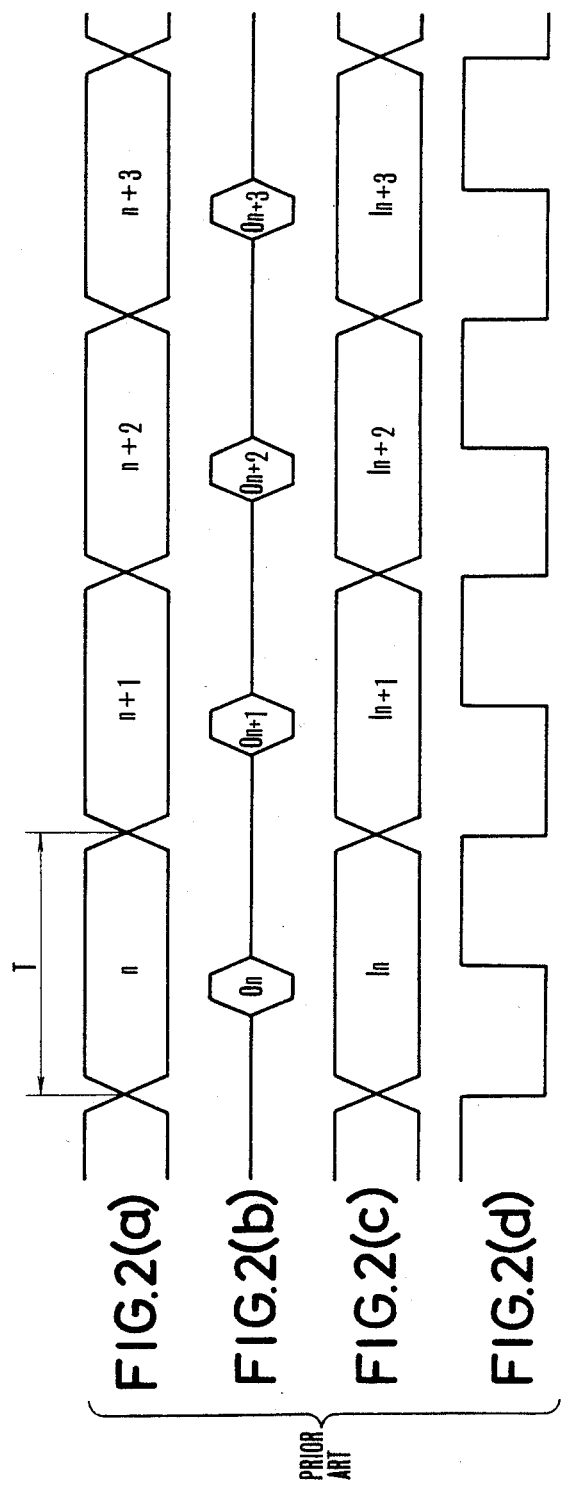
FIGS. 2(a) to 2(d) show in a timing chart the operation of the memory of FIG. 1.
Figure 3:
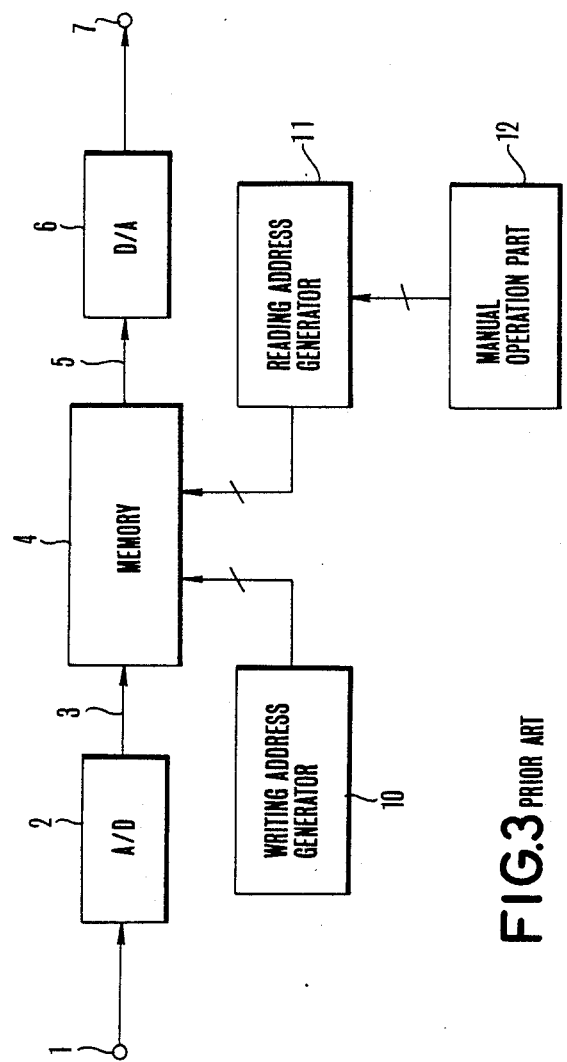
FIG. 3 is a block diagram showing another example of the conventional circuit arrangement around a memory.
Figure 4:
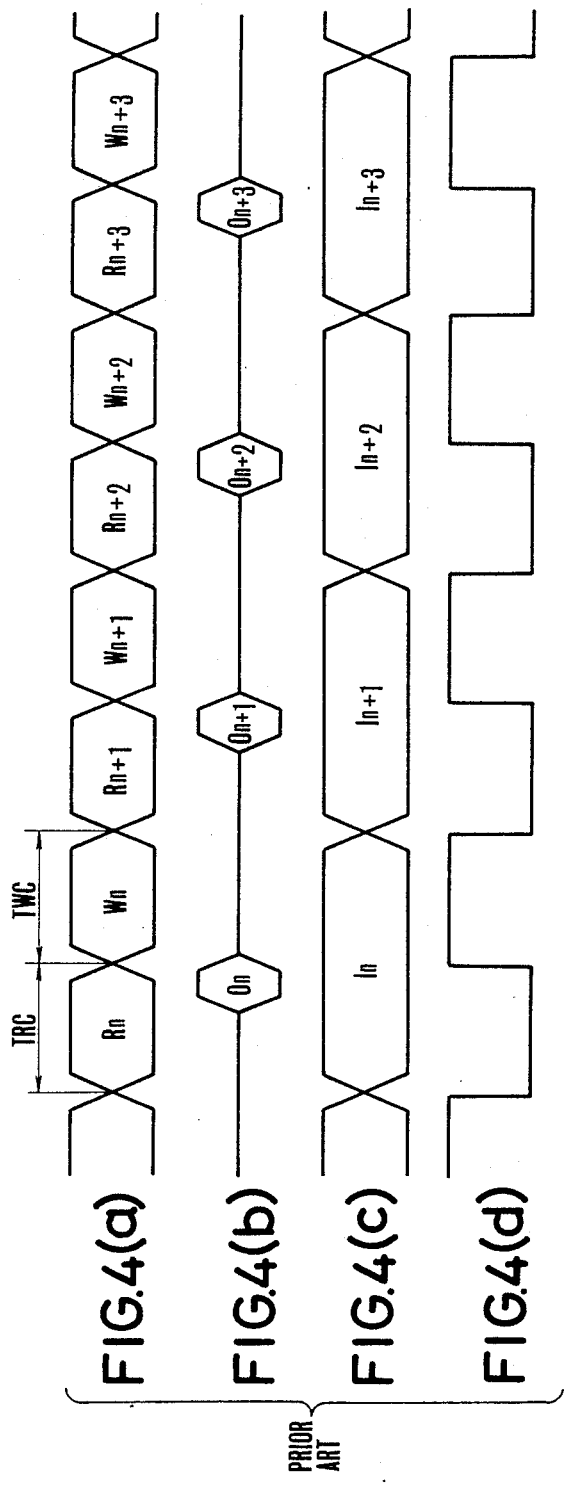
FIGS. 4(a) to 4(d) show in a timing chart the operation of the memory of FIG. 3.
Figure 10:
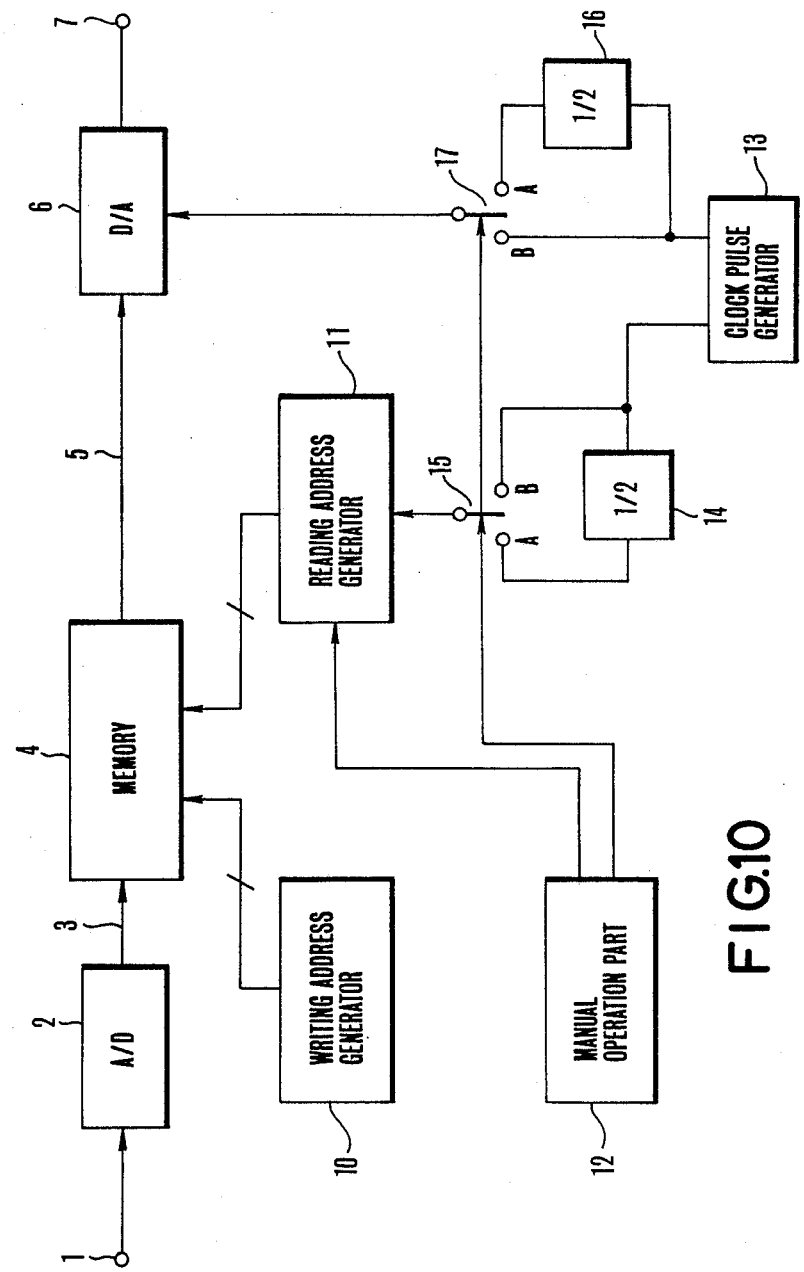
FIG. 10 is a circuit arrangement made around a memory according to the invention as another embodiment thereof.

FIG. 10 shows the data processing device arranged as another embodiment of the invention. In FIG. 10, the components which are similar to those shown in FIG. 3 are indicated by the same reference numerals and the details of them are omitted from this description. The operation of the embodiment in writing and reading a digital signal into and out of the memory 4 is performed in exactly the same manner as in the case of FIG. 3. A clock signal generated from a clock pulse generator 13 is supplied to a reading address generator 11 via a ½ frequency divider 14 and a terminal A of a switch 15. The reading address is thus renewed at a predetermined timing. Meanwhile a D/A converter 6 receives the clock signal which is produced from the clock pulse generator 13 and is obtained through a ½ frequency divider 16 and a terminal A of a switch 17. The D/A converter 6 is thus arranged to operate in a cycle which is the same as the timing at which data is produced from the memory 4. In this case, the addresses given to the memory 4 are as shown in FIG. 11(a) and are the same as in the case of FIG. 4(a). The memory 4 produces a digital signal which is as shown in FIG. 11(c) and is also similar to the signal shown in FIG. 4(b).

Next, the operation of the embodiment in producing a still picture is as follows: When an instruction is given from a manual operation part 12 for producing a still picture, the connecting positions of both the switches 15 and 17 are shifted to the terminals B thereof. The clock signal produced from the clock pulse generator 13 is supplied via the terminal B of the switch 15 to the reading address generator 11 without passing through the frequency divider 14 while another clock signal from the clock pulse generator 13 is supplied via the terminal B of the switch 17 to the D/A converter 6 without passing through the frequency divider 16. Therefore, the address change-over period of the reading address generator 11 and the operation period of the D/A converter 6 are reduced to ½ respectively. FIG. 11(b) shows a reading address obtained in producing a still picture. FIG. 11(d) shows a digital signal output from the memory 4.

In accordance with the arrangement shown in FIG. 10, the reading amount of information obtainable by solely performing a reading action is twice as much as the amount obtainable by performing both writing and reading actions.

Since the amount of information that can be read out from the memory 4 is doubled, the number of scanning lines can be doubled without difficulty. Therefore, in accordance with the arrangement described, while a motion picture output is obtainable by the normal interlace scanning process, a still picture output is obtainable by an interlacing process performed with the number of scanning lines increased by two times. As described in the foregoing, in accordance with the arrangement of the embodiment, data of a double amount of information can be read out from the memory and produced in the form of an analog signal by some simple additional circuit arrangement without increasing the operating speed of the memory.

What is claimed is:

1. A data processing device comprising:
   (a) a first signal generating source arranged to generate a first information signal;
   (b) a second signal generating source arranged to generate a second information signal which has a greater amount of information per unit of time than said first information signal;
   (c) selecting means for selectively producing said first information signal or said second information signal;
   (d) analog-to-digital converting means for analog-to-digital converting signals produced by said selecting means;
   (e) storing means for storing signals digitized by said analog-to-digital converting means; and
   (f) change-over means for changing a sampling frequency of said analog-to-digital converting means and a data writing cycle of said storing means in response to a selecting action of said selecting means, such that the sampling frequency of said analog-to-digital converting means which is obtained while said selecting means is producing said first information signal and that of said analog-to-digital converting means which is obtained while said selecting means is producing said second information signal are caused to differ from each other in a ration of 1:n (wherein n represents an integer which is at least 2).

2. A device according to claim 1, wherein said change-over means is arranged to change the data writing cycle of said storing means from one data writing cycle over to another in the ration of 1 : n.

3. A device according to claim 1, wherein said change-over means is arranged such that the data writing period of said storing means obtained while said selecting means is producing said second information signal is set at a value which is two times as much as a cycle time required by said storing means for data writing or reading.

4. A device according to claim 1, wherein siad first and second information signals include first and second video signals respectively.

5. A device according to claim 4, further comprising synchronizing signal generating means for generating synchronizing signals to be added to said first and second video signals.

6. A device according to claim 5, wherein said first and second video signals have the same horizontal scanning period; and said synchronizing signal generating means include means for generating a first periodic signal of said horizontal scanning period.

7. A device according to claim 6, wherein said first and second video signals differ from each other in vertical scanning period; and said synchronizing signal generating means includes means for generating a second periodic signal of a vertical scanning period of said first video signal by using said first periodic signal and means for generating a third periodic of a vertical scanning period of said second video signal by using said first periodic signal.

8. A data processing device comprising:
   (a) storing means arranged to permit reading of a digital signal stored therein;
   (b) digital-to-analog converting means for converting into an analog signal a digital signal read out from said storing means;
   (c) first and second output means;
   (d) selecting means for selectively supplying said analog signal produced from said digital-to-analog converting means either to said first output means or to said second output means; and
   (e) change-over means for changing an operating frequency of said digital-to-analog converting means from one frequency over to another and a data reading period of said storing means from one period over to another according to a selecting action of said selecting means.

9. A device according to claim 8, wherein said change-over means is arranged to change over the operating frequency of said digital-to-analog converting means in an ratio of integers in accordance with the selecting action of siad selecting means.

10. A device according to claim 9, wherein said change-over means is arranged to change over a data reading cycle of said storing means in a ratio of integers.

11. A device according to claim 8, wherein said second output means is arranged to be capable of producing an information signal of a wider frequency band than that of an information signal produced by said first output means.

12. A device according to claim 11, wherein said change-over means is arranged to set the data reading cycle of said storing means at a cycle which is twice as much as a cycle time required by said storing means for data writing or data reading while said selecting means is supplying said analog signal produced by said digital-to-analog converting means to said second output means.

13. A data processing device comprising:
   (a) storing means arranged to permit writing and reading of a digital signal into and from said storing means;
   (b) digital-to-analog converting means for converting into an analog signal a digital signal read out from said storing means; and
   (c) change-over means for switching said device between first and second modes, said device being arranged,
   in said first mode, to have said storing means perform writing and reading actions on a digital signal and to set an operating frequency of said digital-to-analog converting means at a first frequency and
   in said second mode, to have said storing means perform solely a reading action on a digital signal and to set the operating frequency of said digital-to-analog converting means at a second frequency which is twice as high as said first frequency.

14. A device according to claim 13, wherein, in said second mode, said storing means performs a digital signal reading action at every cycle time required by said storing means for data writing or reading.

* * * * *